United States Patent [19]

Veronesi et al.

[11] Patent Number: 4,926,120

[45] Date of Patent: May 15, 1990

[54] IN-LINE METALLIC DEBRIS PARTICLE DETECTION SYSTEM

[75] Inventors: William A. Veronesi, Glastonbury; Andrew P. Weise, Columbia; Robert W. Reed, South Windsor; Harry I. Ringermacher, West Hartford, all of Conn.

[73] Assignee: United Technologies Corporation, Hartford, Conn.

[21] Appl. No.: 290,531

[22] Filed: Dec. 27, 1988

[51] Int. Cl.$^5$ .................. G01V 3/00; G01R 33/12
[52] U.S. Cl. .................. 324/204; 324/636; 324/698; 324/650; 340/631
[58] Field of Search .......... 340/631; 333/219; 324/58.5 C, 442, 445, 446, 449, 204, 233, 57 Q, 61 QJ, 636, 698, 650

[56] References Cited

U.S. PATENT DOCUMENTS

| | | | |
|---|---|---|---|
| 2,772,393 | 11/1956 | Davis | 324/236 |
| 4,435,680 | 3/1984 | Froncisz | 333/219 |
| 4,446,429 | 5/1984 | Froncisz | 333/219 |
| 4,504,788 | 3/1985 | Froncisz | 333/219 |
| 4,553,094 | 11/1985 | Gehrke | 324/233 |
| 4,570,137 | 2/1986 | DiSilvestro | 333/219 |
| 4,623,835 | 11/1986 | Mehdizadeh | 324/58.5 C |
| 4,654,598 | 3/1987 | Arulanandan | 324/449 |
| 4,721,913 | 1/1988 | Hyde | 333/219 |
| 4,724,389 | 2/1988 | Hyde | 333/219 |

FOREIGN PATENT DOCUMENTS

| | | | |
|---|---|---|---|
| 2027488 | 12/1970 | Fed. Rep. of Germany | 324/204 |
| 0741216 | 6/1980 | U.S.S.R. | 324/204 |
| 0761964 | 10/1980 | U.S.S.R. | 324/204 |

Primary Examiner—Reinhard J. Eisenzopf
Assistant Examiner—Jose M. Solis
Attorney, Agent, or Firm—Peter R. Ruzek

[57] ABSTRACT

An arrangement for detecting metallic particles carried by a fluid includes a metallic probe member which surrounds an elongated passage through which the fluid flows and which is constituted by a split tube having two marginal portions delimiting a gap which extends along said passage and completely separates the marginal portions from one another. Capacitors are arranged at the gap and alternating electric current is caused to flow in the probe member around the passage so that the probe member and the capacitors form a tank circuit having resonance characteristics that are influenced by any inclusion then present in the passage in a manner dependent on the electromagnetic properties of the inclusion. The character of any metallic particle then present in the passage is determined from variations in the alternating electric current that reflect the influence of such metallic particle on the resonance characteristics.

3 Claims, 2 Drawing Sheets

IN-LINE METALLIC DEBRIS PARTICLE DETECTION SYSTEM

Description

1. Technical Field

The present invention relates to particle detection in general, and more particularly to arrangements for detecting metallic particles carried by a fluid, especially lubricating oil.

2. Background Art

There are already known various constructions of detecting arrangements capable of detecting the presence of metallic particles in a flow of a fluid. So, for instance, the British patent application No. 2,101,330 A, published on Jan. 12, 1983, discloses a system for detecting particles in flowing fluids. This system utilizes two inductive coils which are spaced from one another along a section of the path of flow of the fluid and each of which surrounds a portion of this detecting path section. As ferromagnetic particles and other inclusions entrained in the fluid pass through the detecting path section, they cause changes in the electrical impedance of such coils and these changes are then evaluated. The coils and the evaluating circuitry together constitute a detector arrangement which, because it is designed and operated to suppress detection of non-ferromagnetic particles and bubbles on the basis of the sense of the phase shift between the alternating electric current flowing through the coils and the alternating electric field supplied to such coils, determines the presence and sizes of ferromagnetic particles.

However, this detecting arrangement is capable of detecting the ferromagnetic particles only when the total inductance change caused by such particles then present in the detecting path section is above a predetermined threshold, so that small ferromagnetic particles, if permitted to travel through the detecting path section individually or in a haphazard manner, would not be detected. To avoid this undesirable and potentially dangerous situation, such small ferromagnetic particles are accumulated upstream of this detecting path section and released to be carried by the fluid into the detecting path section, either from time to time or when it is determined that the total amount of such accumulated ferromagnetic particles is sufficient to be detected by the above-mentioned detecting arrangement. However, this approach has the disadvantage that the passage of the thus released batch of small ferromagnetic particles through the detecting path section could coincide with, and thus obscure, the passage of relatively large non-ferromagnetic particles, so that the system could furnish unreliable or even misleading results. Also, the coils generate substantial electric fields in the detecting path section and this further detracts from the accuracy of the obtained results in that such electric fields, in contradistinction to magnetic fields, are highly susceptible to the influence thereon of bubbles entrained in the liquid. This influence, in turn, changes the phase of the alternating electric current flowing through the coils in a manner which could mask the passage of ferromagnetic particles through the detecting path section.

Experience with systems of the above type has confirmed that, in addition to their relatively low sensitivity, they also suffer of the important disadvantage of responding not only to entrained ferromagnetic particles, but also to other kinds of particles and air bubbles, in a manner which does not permit the detecting system reliably to distinguish between ferromagnetic particles and other, non-ferromagnetic, inclusions, or between various kinds of such other inclusions. This constitutes a serious or even life-threatening drawback in applications, such as in an aircraft lubricant monitoring application, where it is crucial not only to determine the presence of inclusions in the flow of the fluid, such as lubricating oil, and the size of any of such inclusions, but also to distinguish between inclusions which are relatively innocuous (as, for instance, air bubbles or even dielectric particles entrained in the flow of lubricating oil would be), on the one hand, and usually metallic but not necessarily ferromagnetic particles (for instance those whose presence and/or size is indicative of dangerous deterioration of bearings, transmission gears or the like) which might be indicative of an imminent failure of the aircraft or similar equipment.

Accordingly, it is a general object of the present invention to avoid the disadvantages of the prior art.

More particularly, it is an object of the present invention to provide a particle detecting arrangement which does not possess the disadvantages of the known arrangements of this kind.

Still another object of the present invention is so to develop the particle detecting arrangement of the type here under consideration as to maximize its sensitivity to metallic particles and to minimize its sensitivity to non-metallic inclusions.

It is yet another object of the present invention to devise a particle detecting arrangement of the above type which renders it possible to reliably detect even quite minute individual metallic particles and also to distinguish between ferromagnetic and non-ferromagnetic metallic particles.

A concomitant object of the present invention is an arrangement of the above type designed in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in an arrangement for detecting metallic particles carried by a fluid. The detecting arrangement includes means for bounding at least one elongated passage for the flow of the fluid therethrough and a metallic probe member which is stationary with respect to the bounding means and is constituted by a split tube which extends around the passage and has two marginal portions delimiting a gap which extends along the passage and completely separates the marginal portions from one another. The arrangement further includes capacitor means which is arranged at the gap and includes at least two mutually facing capacitor surfaces each electrically connected with one of the marginal portions of the probe member, and at least one dielectric layer interposed between the capacitor surfaces. There is further provided means for causing alternating electric current to flow in the probe member around the passage between the two capacitor surfaces so that the probe member and the capacitor means form a tank circuit having resonance characteristics that are influenced by any inclusion then present in said passage in a manner dependent on the electromagnetic properties of the inclusion. Last but not least, the arrangement of the invention includes means for determining the character of at least any metallic particle then present in the passage from variations in the alternating electric current that reflect the influence of such metallic particle on the resonance characteristics.

A particular advantage of the arrangement as described so far is that, as a consequence of the construction of the probe member as a split tube and of the positioning of the capacitor means at the gap of the split tube, the above tank circuit exhibits an extremely high Q factor. This, coupled with the operation of the above tank circuit at resonance, results in a situation in which even very small metallic particles individually passing through the passage surrounded by the probe member cause an immediate pronounced or perceptible change in the resonance characteristics of the tank circuit, with the sense of the change depending on whether the metallic particle is or is not ferromagnetic. At the same time, the split tubular configuration of the probe member results in only a minimum electric field in the passage so that bubbles and other dielectric inclusions have only a minimum, if any, influence on the resonance characteristics of the tank circuit and, consequently, the passage of such dielectric inclusions through the interior of the probe member will hardly be perceived by the determining means, if at all.

BRIEF DESCRIPTION OF THE DRAWING

The present invention will be described in more detail below with reference to the accompanying drawing in which.

BEST MODE FOR CARRYING OUT THE INVENTION

Figure 1:
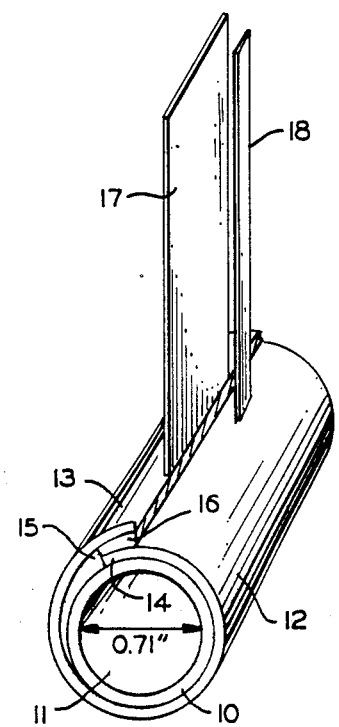
FIG. 1 is a perspective view of an arrangement of the present invention for detecting the presence and character of metallic particles in a flowing fluid.

Referring now to the drawing in detail, and first to FIG. 1 thereof, it may be seen that the reference numeral 10 has been used therein to identify a tubular probe housing or pipe section. The pipe section 10, which is of a non-conducting unity magnetic permeability material, bounds a passage 11 for the flow therethrough of a fluid that is to be examined for the presence therein of various inclusions, such as magnetic and non-magnetic metallic particles.

A probe member 12 of a highly electrically conductive material, such as copper, is arranged in such a manner as to be stationary relative to the pipe 10 and to circumferentially surround the passage 11. For instance, the probe member 12 may be embedded or potted in the pipe section 10. The probe member 12 is constituted by a split tube or sleeve and it has respective marginal portions 13 and 14 which bound a gap 15 with one another. The split tubular probe member 12 may have an axial length of, for instance, 1⅛" and a diameter of about 0.71", and may be made of 3 mil thick copper sheet. It will be appreciated, though, that the above dimensions, while they have been carefully chosen for a particular construction of the detecting arrangement of the present invention, may be altered without departing from the present invention, so long as the altered dimensions satisfy the operating criteria that will be discussed below.

In the probe member construction illustrated in FIG. 1, the marginal portions 13 and 14 overlap one another, and a capacitor arrangement 16 is interposed between the overlapping regions of the marginal portions 13 and 14. The capacitor arrangement 16 may include merely a layer or slab of dielectric material, in which case the overlapping regions of the marginal portions 13 and 14 constitute respective capacitor plates. However, more often than not, the surface areas of the overlapping regions of the marginal portions 13 and 14 are insufficient to provide the required capacitance. In such a case, in accordance with the present invention, the capacitor arrangement 16 may be constituted by a single multilayer capacitor device, or preferably by a number of such multilayer devices which are distributed at predetermined, such as substantially identical, intervals along the gap 15 between the overlapping regions of the marginal portions 13 and 14 of the tubular probe member 12.

In an alternative construction of the probe member 12 which is not illustrated in the drawing, the marginal portions 13 and 14 are turned up as considered in FIG. 1 of the drawing, thus giving the gap 15 which accommodates the capacitor arrangement 16 a vertical orientation. Another alternative construction of the probe member 12, which is also not shown in the drawing, has the marginal portions 13 and 14 aligned with one another in the circumferential direction and separated from each other by the gap 15, and the capacitor arrangement 16 being located at the exterior of the probe member 12 and spanning the gap 15. In either case, if the probe member 12 is embedded in the housing or pipe section 10, so may be the capacitor arrangement 16.

The multilayer capacitor device, or each of such devices, which is used in the capacitor arrangement 16 of the above-mentioned type, may include, as is well known to those familiar with design and manufacture of capacitors two sets of capacitor plate layers. The capacitor plate layers of each set are electrically connected with one another and the capacitor plate layers of one of the sets are interleaved with those of the other set. Each adjacent two of the capacitor plate layers, which belong to different sets, are separated from each other by an intervening dielectric separation layer. The capacitor plate layers of one of the sets are electrically connected with the marginal portion 13, while the capacitor plate layers of the other set are electrically connected with the marginal portion 14.

As further shown in FIG. 1 of the drawing, the marginal portions 13 and 14 have respective electric leads 17 and 18 connected to them. The electric leads 17 and 18 serve to supply alternating electric current to the marginal portions 13 and 14. When this occurs, the split tubular member 12 forms a parallel tank circuit with the capacitor arrangement 16. Because of the split tubular configuration of the probe member 12 and the location of the capacitor arrangement 16 at the gap 15, that is, as close as physically possible to the marginal portions 13 and 14, this tank circuit has the highest Q factor achievable at the frequency chosen for the alternating electric current. It will be appreciated that an important criterion in altering the dimensions of the probe member 12 (and/or the capacitance of the capacitor arrangement 16) is the preservation of this high Q factor at the selected operating frequency.

The existence of this high Q factor means that, when the electric current supplied to the marginal portions 13 and 14 through the electric leads 17 and 18 alternates at such a frequency that the tank circuit operates at or close to resonance in the absence of any inclusions from the fluid present in the passage 11, any change in the characteristic response of the contents of the passage 11 caused, for instance, by the presence of metallic particles in the fluid flowing through the passage 11, will introduce an imbalance into the operation of this tank circuit in a manner dependent on the electromagnetic properties of such inclusions. More particularly, ferromagnetic metallic particles influence the electromagnetic field generated by the probe member 12 and thus the electric current flowing in the tank circuit differently than dielectric particles or other dielectric inclusions, and metallic non-ferromagnetic particles influence the electromagnetic field differently than either the metallic ferromagnetic particles or the dielectric inclusions, resulting in a different phase shift in each instance, while the magnitude of the change depends, by and large, on the size of the respective particle or inclusion. At the same time, however, the split tubular configuration of the probe member 12 results in a situation where the electric field within the probe member 12 is as low as possible, so that air bubbles which are frequently encountered in lubricants will affect the operation of the aforementioned tank circuit only to an insignificant extent, if at all.

Figure 2:
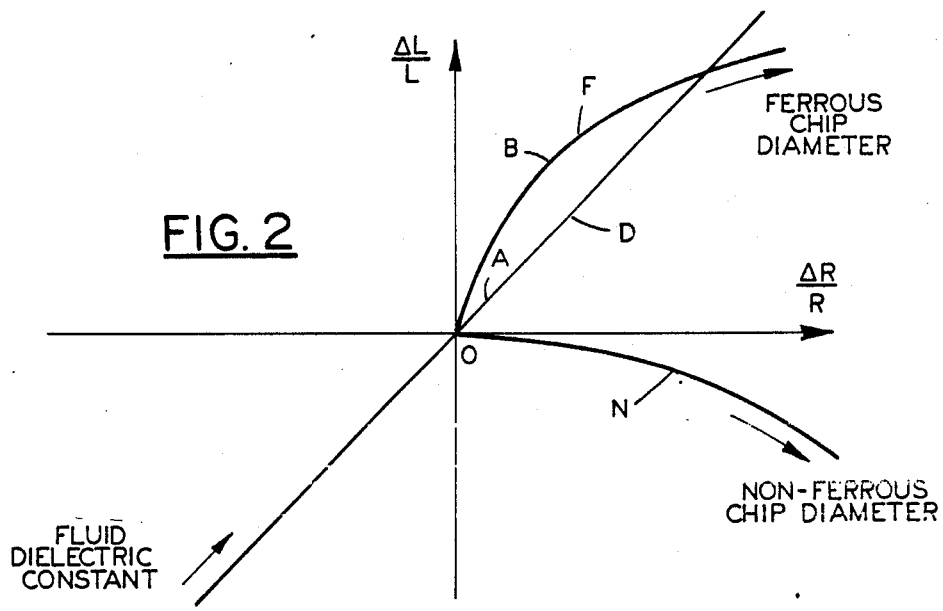
FIG. 2 is a graph depicting the response of the arrangement of FIG. 1 to various metallic and non-metallic inclusions entrained in the fluid flowing therethrough.

The phase shift response of the tank circuit constructed in accordance with the present invention to changes in the electromagnetic properties of the contents of the passage 11 is diagrammatically depicted in FIG. 2 of the drawing in which the point of origin 0 represents the conditions encountered when the passage 11 is filled with lubricating oil devoid of any inclusions. If the dielectric constant of the fluid present in or flowing through the passage 11 changes, which may occur, for instance, due to replacement of the original dielectric fluid by another dielectric fluid, both the relative resistivity ($\Delta R/R$) and the relative impedance ($\Delta L/L$) of the overall tank circuit (which includes the fluid present in the passage 11 in addition to the aforementioned tank circuit proper that is constituted by the split-tube probe member 12 and the capacitor arrangement 16) change generally to the same relatively small degree. This is indicated in FIG. 2 by the point A located on a straight line D, the distance OA being representative or the worst case scenario involving complete replacement of lubricating oil by air. It may be seen that the above distance is rather small, and it will be appreciated that in actual operation of the detecting arrangement only a limited amount of air will usually be present in the lubricating oil so that the actual deviation from the point 0 along the line D on account of air bubbles will be so small as to be negligible.

On the other hand, when a ferromagnetic particle enters the internal passage 11 that is surrounded by the split-tube probe member 12, they both the relative impedance and the relative resistivity change in dependence on the size of the particle so as to be located on a curved line F which is applicable when the ferromagnetic particle is substantially spherical. As an example, point B of the curve F may be reached when the spherical ferromagnetic particle is about 7 mils in diameter, and the distance on the curve F from the point 0 will be lesser for smaller and greater for larger spherical ferromagnetic particles. For other shapes of the ferromagnetic particles, other curves akin to curve F and forming a family therewith apply, but all such curves are always located in the first quadrant of the graph depicted in FIG. 2. Thus, it may be seen that the values located in the first quadrant are indicative of the ferromagnetic character of the respective particle, and that the extent of deviation from the point 0 is indicative of the size of the respective ferromagnetic particle.

In contradistinction thereto, when the particle entering the internal passage 11 of the split tubular probe member 12 is metallic but non-ferromagnetic, the relative resistivity still changes in the positive sense, but the relative impedance changes in the negative sense, in accordance with the representative curve N of a curve family akin to that mentioned above, with all curves of this family this time being always located in the fourth quadrant of the FIG. 2 graph, and the distance along the respective curve, such as N, being again indicative of the size of the respective metallic non-ferromagnetic particle. Thus, when it is determined that the value lies in the fourth quadrant, then the particle must be metallic and non-ferromagnetic, while the distance from the point of origin 0 gives the size of such particle.

Figure 3:
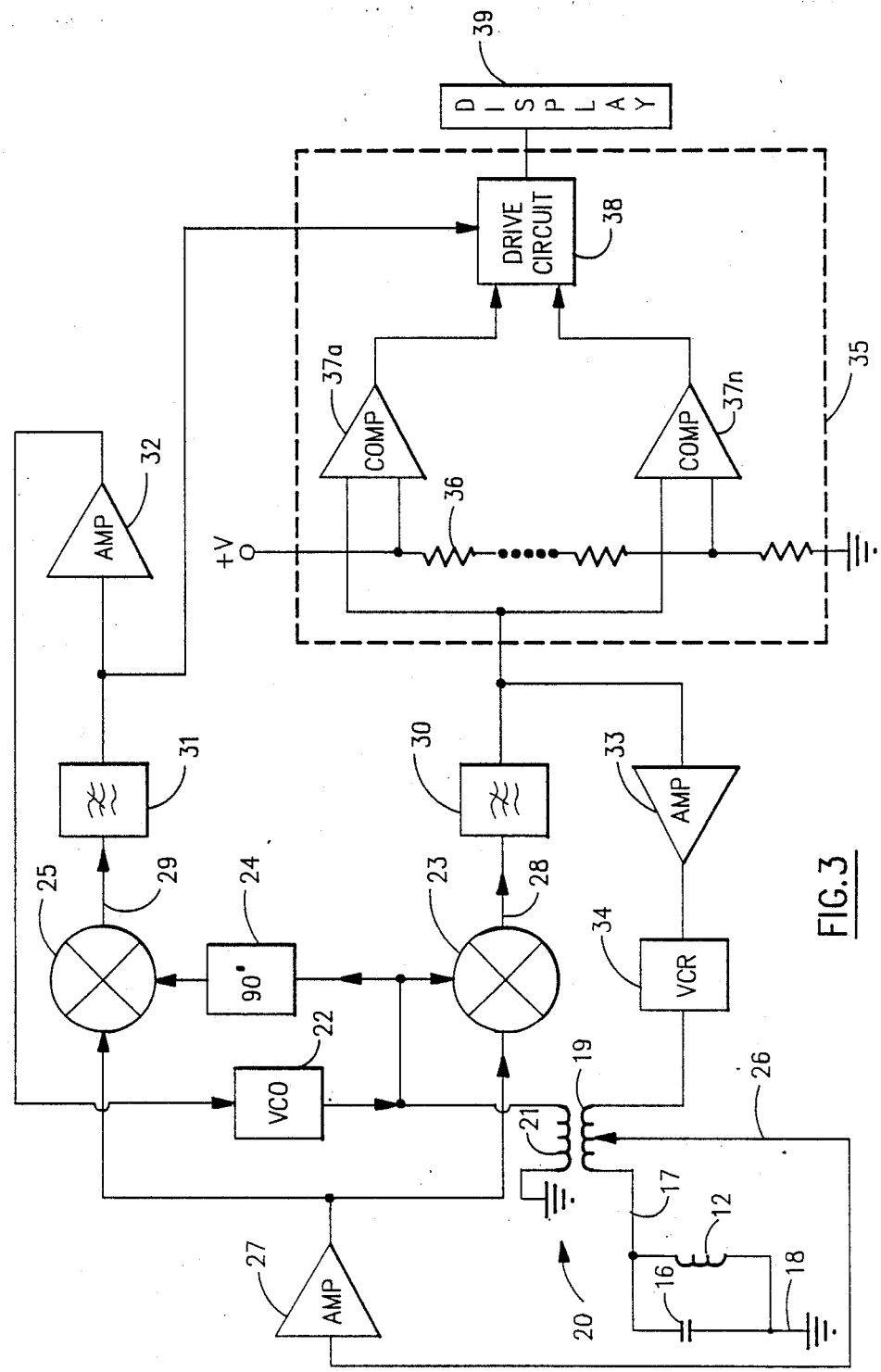
FIG. 3 is a simplified diagrammatic view of a circuit of the present invention capable of determining the character of any entrained metallic particle from the response of the arrangement of FIG. 1.

A circuit constructed in accordance with the present invention to gather and decipher the above information is presented in FIG. 3 of the drawing where the same reference numerals as before have been used to identify corresponding parts (i.e. their electrical equivalents). The lead 18 from the tank circuit 12 and 16 is shown to be grounded, while the lead 17 is connected to one end of one transformer winding 19 of a driving and pickup transformer 20. The transformer 20 further includes another transformer winding 21 whose one end is grounded while the other end thereof is supplied with an alternating electric current from a voltage controlled oscillator (VCO) 22. The alternating electromagnetic field generated by the other transformer winding 21 induces a correspondingly alternating electric current in the one transformer winding 19, and this latter electric current drives the tank circuit 12 and 16. The frequency of the alternating electric current issued by the oscillator VCO is such that the tank circuit 12 and 16 operates at or close to resonance at least when the passage 11 (FIG. 1) is filled exclusively with lubricating oil.

The alternating electric current is also supplied directly to one input of a first mixer 23, and through a 90° phase shifter 24 to one input of a second mixer 25. A line 26 supplies an alternating electric current derived from the one coil 19 and thus representative of the alternating electric current flowing through the one coil 19 and thus into and out of the tank circuit 12 and 16 to a preamplifier 27 from where the amplified electric current is supplied to another input of the first mixer 23, as well as to another input of the second mixer 25, where the respective incoming alternating electric currents are mixed with one another, with the result that respective in-phase and quadrature error signals indicative of the difference between the output frequency of the VCO 22 and the frequency encountered in the tank circuit 12 and 16 appear at respective outputs 28 and 29 of the mixers 23 and 25. These error signals are then filtered by respective low-pass filters 30 and 31 to obtain respective resistive (in-phase) and reactive (quadrature) error signals.

The reactive error signal is supplied to a reactive error amplifier 32 which amplifies this reactive error signal, and this amplified reactive error signal is then supplied to an input of the VCO 22 which changes its operating (output) frequency in dependence on the magnitude of the amplified reactive error signal. Similarly, the resistive error signal is fed to an input of a resistive error amplifier 33 which amplifies this resistive error signal, and this amplified resistive error signal is then supplied to an input of a voltage controlled resistor (VCR) 34 which is interposed between the other end of the one transformer winding 19 and the ground and whose resistance varies in dependence on the magnitude of the amplified resistive error signal. The resistive and reactive error amplifiers 33 and 32 are constructed to operate with a relatively large time constants, so that the resistance of the VCR 34 and the frequency of the VCO 22 change gradually in response to relatively long-term changes, especially those due to temperature variations, of the resonance characteristics of the tank circuit and/or of the characteristic properties of the contents of the passage 11. On the other hand, short-lived changes in such characteristic properties, such as those caused by the passage of individual metallic particles through the interior of the probe member 12, will leave the performance of the VCO 22 and of the VCR 34 virtually unaffected.

The output signals of the low-pass filters 30 and 31 are also supplied to an evaluating circuit 35 which is constructed to evaluate the reactive and resistive error signals to determine therefrom the character and size of any metallic particle then present in the passage 11. A quite simple exemplary implementation of the evaluating circuit 35 is shown in FIG. 3 of the drawing, but it is to be understood that the evaluating circuit 35 may have other configurations, depending on needs, or requirements for accuracy. The illustrated implementation of the evaluating circuit 35 incorporates a voltage divider 36 and a plurality of comparators 37a to 37n (n being any arbitrarily chosen integer) each of which has two inputs one of which is connected to an associated section of the voltage divider 36 while the other input is supplied with the filtered resistive error signal appearing at the output of the low-pass filter 30. Thus, the comparators 37a to 37n compare the filtered resistive error signal voltage with various reference voltage levels derived from the voltage divider 36, and that or those of the comparators 37a to 37n at which the filtered resistive error voltage exceeds the respective reference voltage issues an output signal or issue respective output signals which is or are then supplied to a drive circuit 38 of any known construction which drives a display 39. Furthermore, the filtered reactive error signal appearing at the output of the low-pass filter 32 is also supplied to the drive circuit 38 and is used to drive the display 39 accordingly.

It will be appreciated that, in the construction of the evaluating circuit 35 depicted in FIG. 3, the drive circuit 38 and the display 39 may be constructed in any well-known manner to present a numerical indication of the value of the resistive error signal which, as a reference to FIG. 2 will reveal, is indicative of the size of the respective metallic particle, whether such particle is ferromagnetic or non-ferromagnetic, and to present a simple, for instance on/off, indication of the sign of the reactive error signal to distinguish ferromagnetic metallic particles from non-ferromagnetic ones. However, it ought to be realized that it is also contemplated by the present invention to provide other constructions of the evaluating circuitry 35 and/or of the display 36, which present more sophisticated and/or more accurate results. So, for instance, the reactive and resistive error signals from the outputs of the filters 30 and 32 have been supplied to an oscillograph for recording thereat, and the thus recorded traces of the reactive and resistive error signals have been compared and evaluated in view of one another to determine both the size and the magnetic properties of respective particles. Of course, it is also contemplated to automate this cross-referencing procedure to determine the exact location of the response to the respective particle on the graph of FIG. 2 with attendant more precise determination of the characteristics (size, magnetic properties) of the respective particle.

Figure 4:
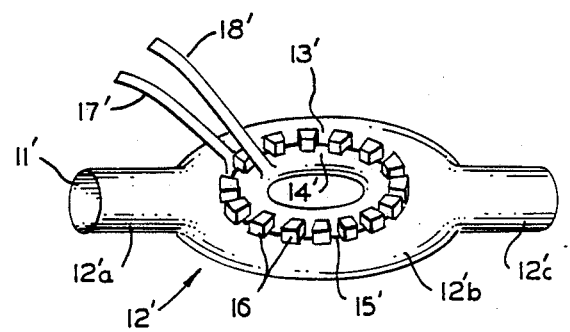
FIG. 4 is a view similar to that of FIG. 1 but showing a modified configuration of the detecting arrangement of the present invention.

FIG. 4 of the drawing, in which the same reference numerals as before but supplemented with a prime have been used to identify corresponding parts, illustrates an alternative construction wherein the probe member 12' includes a tubular inlet portion 12'a toroidal central portion 12'b, and a tubular marginal portion 12'c. The gap 15' in this instance is arranged at the top of the toroidal central portion 12'b and extends all along a circle between the marginal portions 13' and 14' that are circumferentially aligned with one another, while the capacitor arrangement 16, which is shown to consist of a plurality of equidistantly arranged separate capacitor devices of the type mentioned earlier, is arranged at the exterior of the central portions 12'b and spans the gap 15'. This particular construction of the probe member 12' has the advantage that the magnetic field in the portion of the passage 11' that is situated within the central portion 12'b is much more uniform and lower than in the construction of FIG. 1, due to the absence of end edges from the toroidal central portion 12'b in which the passage of the metallic particles is being detected, with attendant additional reduction of sensitivity of the detecting arrangement to bubbles and other dielectric inclusions.

While the present invention has been illustrated and described as embodied in a particular construction of a metallic particle detection arrangement, it will be appreciated that the present invention is not limited to this particular example; rather, the scope of protection of the present invention is to be determined solely from the attached claims.

We claim:

1. An arrangement for detecting metallic particles carried by a fluid, comprising
   means for bounding at least one elongated passage for the flow of the fluid therethrough;
   a metallic probe member stationary with respect to said bounding means and extending around said passage;
   capacitor means including at least two mutually facing capacitor surfaces each electrically connected with a different portion of said probe member, and at least one dielectric layer interposed between said capacitor surfaces;
   means for causing alternating electric current to flow in said probe member around said passage and to and from said two capacitor surfaces so that said probe member and said capacitor means form a tank circuit having resonance characteristics that are influenced by any inclusion then present in said passage in a manner dependent on the electromagnetic properties of said inclusion, including means for supplying an alternating electric excitation current to said probe member, said supplying means including a voltage controlled oscillator having a control input;

means for determining the character of any metallic particle then present in said passage from variations in said alternating electric current that reflect the influence of such metallic particle on said resonance characteristics, including means for mixing an alternating voltage of said alternating electric current separately in phase and in quadrature with an alternating voltage representative of said alternating electric excitation current, respectively, to obtain respective resistive and reactive error signals when any metallic particle is present in said passage, and means for evaluating said resistive and reactive error signals to obtain therefrom information about the size and magnetic properties of such metallic particle; and reactive error feedback means for feeding said reactive error signal to said control input of said voltage controlled oscillator.

2. The arrangement as defined in claim 1, wherein said supplying means includes a voltage controlled oscillator having a control input; and further comprising reactive error feedback means for feeding said reactive error signal to said control input of said voltage controlled oscillator.

3. The arrangement as defined in claim 1, and further comprising a voltage controlled resistor arranged in circuit with said probe member and having a control input, and resistive error feedback means for feeding said resistive error signal to said control input of said voltage controlled resistor.

* * * * *